United States Patent [19]
Chagnon

[11] 3,873,421
[45] Mar. 25, 1975

[54] PROPAGATION OF ATTENUATED RUBELLA VIRUS ON TURKEY EMBRYO TISSUE

[76] Inventor: André Chagnon, 417 Hillside St., Rosemere, Quebec, Canada

[22] Filed: Aug. 13, 1973

[21] Appl. No.: 387,817

[30] Foreign Application Priority Data
Aug. 14, 1972  United Kingdom........... 37820/72

[52] U.S. Cl..................................... 195/1.3, 424/89
[51] Int. Cl. ....................... A61k 23/00, C12k 7/00
[58] Field of Search........................ 424/89; 195/1.3

[56] References Cited
UNITED STATES PATENTS

| | | | |
|---|---|---|---|
| 3,651,212 | 3/1972 | Meyer et al............................ | 424/89 |
| 3,655,872 | 4/1972 | Kono et al. ........................... | 424/89 |
| 3,804,713 | 4/1974 | Yaoi .................................... | 424/89 |

*Primary Examiner*—Sam Rosen
*Attorney, Agent, or Firm*—Alan Swabey; Robert E. Mitchell; Guy J. Houle

[57] ABSTRACT

Rubella virus HPV-77 is propagated on turkey embryo tissue culture while maintaining the titer and other characteristics of the starting virus.

7 Claims, No Drawings

PROPAGATION OF ATTENUATED RUBELLA VIRUS ON TURKEY EMBRYO TISSUE

BACKGROUND OF THE INVENTION

1. Field of the Invention

This invention relates to the propagation of a rubella virus HPV-77.

2. Description of the Prior Art

The attenuation of this virus is described by Mayer, Jr. et al. in U.S. Pat. No. 3,651,212, Mar. 21, 1972, whose disclosure is hereby incorporated by reference.

The problem of propagating an attenuated rubella virus is that the properties of the starting virus must be preserved, particularly the ability to readily propagate in high titer in a test cell medium without over-attenuating.

Proposals have been made for propagating rubella virus HPV-77 in duck embryo tissue culture, chick embryo tissue culture and dog embryo tissue culture. All these methods have certain disadvantages.

SUMMARY OF THE INVENTION

The applicant has now found that rubella virus HPV-77 can be readily propagated, without over-attenuation, in turkey embryo tissue culture, to provide a supply of virus which has the characteristics of the starting virus, including the ability to propagate in high titer in RK-13 cells and to induce interferon when grown on monkey kidney cell culture. According to the invention, the virus HPV–77 is passed from one to four times through the turkey embryo tissue culture.

More specifically, the starting virus is introduced into turkey embryo tissue cell culture. It is incubated in the culture at a temperature compatible with the growth of the tissue and virus, for example, within the range from about 30°C. to about 37°C. The virus is harvested and reintroduced into fresh turkey embryo cell tissue culture. The passage of the virus through the culture is carried out from one to four times. The medium may be harvested and reintroduced into fresh culture every 1 to 3 days after the third day. The procedure may be carried out up to 14 days without unduly reducing the titer. The virus HPV–77 has a titer of $10^{4.3}$ per half milliliter. The virus propagated, according to the invention, after three passages has a maximum titer within the range from about $10^{3.5}$ to $10^{3.75}$ per half milliliter. Surprisingly, after a single passage the virus has an adequate titer, i.e., over $10^2$ per half milliliter (see Table 3).

A feature of the invention is that the propagation may be effected on turkey embryo cell culture in the absence of bovine serum, for example fetal calf serum, towards the virus produced being used as a vaccine for humans.

The HPV–77 strain of rubella virus was obtained from Dr. P. D. Parkman and Dr. H. Meyer, Jr., of the National Institute of Health, U.S.A. It was a strain recovered after the 77th passage of an M–33 strain of virulent rubella virus in primary culture of African green monkey kidney cell cultures, as described in U.S. Pat. No. 3,651,212.

Ordinarily, in these passages, 0.2 ml. of undiluted supernatant fluids and scraped cells were sub-cultured at 7 to 10 day intervals in cultures maintained at 35° to 36°C. in stationary racks. Exceptions to this procedure were made at the 5th–6th and 69th–73rd and 75th passage levels. The 5th and 6th were incubated at 32°C. in roller drums and the 69th–73rd and 75th passage levels were made as limiting infectious dilutions for purification.

The present invention will now be described in further detail with reference to the following examples.

EXAMPLE I

A. Tissue culture

Eleven to 14 day-old embryonated turkey eggs were employed to prepare tissue cultures. Tissue culture was seeded in a concentration of 300,000 cells per ml. and was obtained as monolayer cultures in 75 $cm^2$ plastic flasks (Falcon Co.) and 1,225 $cm^2$ roller bottles (New Brunswick Scientific Co.). Primary AGMK cell cultures were prepared as described in "Freezing and storing of monkey and rabbit kidney cells for tissue cultures," Chagnon, A., and Pavilanis, V. Cryobiology 3, 81–84 (1966) which describes the preparation and storage at low temperature of monkey and rabbit kidney cells and in "Delay of the appearance of cytopathic effect by latent viruses in monkey kidney cell cultures after freezing and storing at low temperature," Chagnon, A. and Pavilanis, V., Arch. fuer ges. Virusforsch. 19, 435–441 (1966), which describes the quality of the cellular substrate.

The following procedure was followed to estimate the biological quality of the cell substrate. The turkey embryonic cultured cells were examined during 21 days for the presence of cytopathic effects. No cytopathic effect nor changes in cell morphology were observed. Hemadsorption, using guinea-pig erythrocytes was also negative.

Ultrathin sections of the cultured cells and negative stained pellet of ultracentrifugated supernatants of the cultured cells were examined under electron-mircoscope. No virus-like nor mycoplasm-like particles were seen.

Embryonic turkey cells were cultured and examined for the presence of adventitious agents with the help of the immunofluorescence technique. Monolayers of turkey cells were prepared in two series: (a) infected with HVT virus (Paul, P., Larsen, C. T., Kumar, M. C., and Pomeroy, B. S., 1972. Preliminary observations on egg transmission of turkey herpesvirus (HVT) in turkeys. Avian Diseases, 16: 27-33), and (b) non-infected.

Turkey sera, obtained from 20 different flocks, including five individuals each, were added to the infected cultures as well as to the controls (non-infected cultures). After an appropriate time of incubation, a turkey antiglobulin serum conjugated with fluorescein was added to each culture. After an appropriate time of incubation, each sample was examined under fluorescent microscope. No fluorescence has been detected in the controls while all sera were positive on the infected cells, demonstrating that all turkeys were seropositive to the HVT virus, whereas the embryonic cell cultures were free of this virus and other adventitious agents.

B. Tissue culture medium

Growth media consisted of M–199[1] in Hank's Balanced Salt Solution (BBS)[2] supplemented with 6% fetal calf serum and 1% neomycin (50 mcg per ml). Maintenance media consisted of Minimum Essential Medium (MEM)[3] in Earle's Balanced Salt Solution (BBS)[4] supplemented with 1% fetal calf serum and 1% neomycin. In some instances, maintenance medium was used without fetal calf serum.

| ¹M-199 composition as follows: | Mg./l. |
|---|---|
| l-Arginine | 70 |
| l-Histidine | 20 |
| l-Lysine HCl | 70 |
| dl-Tryptophane | 20 |
| dl-Phenylalanine | 50 |
| dl-Methionine | 30 |
| dl-Serine | 50 |
| dl-Threonine | 60 |
| dl-Leucine | 120 |
| dl-Isoleucine | 40 |
| dl-Valine | 50 |
| dl-Glutamic acid | 150 |
| dl-Aspartic acid | 60 |
| dl-Alanine | 50 |
| l-Proline | 40 |
| l-Hydroxyproline | 10 |
| Glycine | 50 |
| l-Glutamine | 100 |
| Sodium acetate | 50 |
| l-Tyrosine | 40 |
| l-Cystine | 20 |
| Niacinamide | 0.025 |
| Niacin | 0.025 |
| Pyridoxine HCl | 0.025 |
| Pyridoxal HCl | 0.025 |
| Thiamine HCl | 0.01 |
| Riboflavin | 0.01 |
| Calcium pantothenate | 0.01 |
| i-Inositol | 0.05 |
| p-Aminobenzoic acid | 0.05 |
| Choline chloride | 0.5 |
| α-Biotin | 0.01 |
| Folic acid | 0.01 |
| Calciferol (vit. $D_2$) | 0.1 |
| Cholesterol | 0.2 |
| Sorbitan mono-oleate (Tween 80) | 20 |
| Disodium-α tocopherol phosphate (vit. E) | 0.01 |
| Menadione (vit. K) | 0.01 |
| Adenine sulphate | 10 |
| Xanthine | 0.3 |
| Hypoxanthine | 0.3 |
| Thymine | 0.3 |
| Uracil | 0.3 |
| Guanine HCl | 0.3 |
| Deoxyribose | 0.5 |
| Ribose | 0.5 |
| Adenylic acid | 0.2 |
| Ferric nitrate [$Fe(NO)_3$] | 0.1 |
| Cysteine HCl | 0.1 |
| Glutathione | 0.5 |
| Ascorbic acid | 0.5 |
| Vitamin A | 0.1 |
| Adenosine triphosphate (Di-Sodium salt) | 1 |

| ²Hank's BSS | Mg./l. |
|---|---|
| NaCl | 8000 |
| KCl | 400 |
| $MgSO_4.7H_2O$ | 200 |
| $Na_2HPO_4.2H_2O$ | 60 |
| $KH_2PO_4$ | 60 |
| Glucose | 1000 |
| Phenol Red | 20 |
| $CaCl_2$ (anhydrous) | 140 |
| $NaHCO_3$ | 350 |

| ³MEM composition as follows: | Mg./l. |
|---|---|
| l-Arginine HCl | 105 |
| l-Cystine | 24 |
| l-Glutamine | 292 |
| l-Histidine | 31 |
| l-Isoleucine | 52 |
| l-Leucine | 52 |
| l-Lysine | 58 |
| l-Methionine | 15 |
| l-Phenylalanine | 32 |
| l-Threonine | 48 |
| l-Tryptophan | 10 |
| l-Tyrosine | 36 |
| l-Valine | 46 |
| Choline chloride | 1.0 |
| Folic acid | 1.0 |
| Nicotinamide | 1.0 |
| D-Ca Pantothenate | 1.0 |
| Pyridoxal HCl | 1.0 |
| Thiamine HCl | 1.0 |
| Riboflavin | 0.1 |
| i-Inositol | 2.0 |

| ⁴Earle's BSS composition as follows: | mg./l. |
|---|---|
| NaCl | 6800 |
| KCl | 400 |
| $MgSO_4.7H_2O$ | 200 |
| $CaH_2PO_4.H_2O$ | 140 |
| Glucose | 1000 |
| Phenol Red | 20 |
| $CaCl_2$ (anhydrous) | 200 |
| $NaHCO_3$ | 2200 |

The rubella virus was grown at 32°C. in turkey embryo tissue culture. The virus is thermo-labile. Therefore, the yields vary at various temperatures. At lower temperatures, the virus will reproduce more slowly but its half life is greater. At higher temperatures, the virus will reproduce faster but its half life is shorter. Adequate growth can be obtained at temperatures of 30° to 37°C., preferably 32°-35°C.

The titration tests performed in the AGMK tissue culture were performed by the enterovirus interference technique more fully described in "Recovery of rubella virus from army recruits," Parkman, P. D., Buescher, E. L., and Artenstein, M. S., Proc. Soc. Exper. Biol. Med. III, 215–225 (1962).

The infectivity test end-points were determined by the method in "A simple method of estimating fifty per cent end-points," Reed, J. L., and Muench, H., Amer. J. Hyg. 27, 495–497 (1937).

The high passage rubella virus HPV–77 was grown in turkey embryo tissue culture maintained in medium with and without fetal calf serum at 32°C. Optimum growth was obtained after 3 days and maintained during 14 days at which time the experiments were terminated.

In some cases, the complete medium was changed daily and replaced with fresh medium. In other cases, the complete medium was harvested alternately every 1 to 3 days.

The results obtained in the infected cultures maintained without fetal calf serum were as good as those obtained in medium supplemented with fetal calf serum.

The results are as shown in Table 1.

TABLE I

GROWTH OF HIGH-PASSAGE RUBELLA VIRUS (HPV-77) STRAIN IN TURKEY EMBRYO TISSUE CULTURE

| Days* | Experiments | 3 | 4 | 5 | 6 | 7 | 10 | 11 | 12 | 13 | 14 |
|---|---|---|---|---|---|---|---|---|---|---|---|
| With 1% serum | 1 | 4.0** | 3.5 | 3.25 | 3.25 | 3.25 | 3.0 | 3.5 | 3.5 | 3.75 | 1.25 |
|  | 2 | 3.5 | 3.25 | — | — | 3.0 | 3.5 | 3.5 | — | — | 3.5 |
| Without serum | 1 | 3.5 | 3.0 | 3.75 | 3.75 | 3.5 | 3.5 | 2.5 | 1.75 | 2.0 | 1.25 |
|  | 2 | 3.25 | 1.75 | — | — | 1.5 | 2.5 | 2.25 | — | — | 3.0 |

* Number of days following infection of the cultures.
** Infectivity end-points in $\log_{10}/0.5$ ml virus suspension.
Note 1 Virus yield was somewhat more consistent in daily harvests when serum was used in the maintenance medium.
Note 2 When grown in the absence of the serum virus yields appeared to be somewhat higher when harvested after a three-day interval.

EXAMPLE II

Rubella virus HPV-77 was serially passaged in turkey embryo tissue culture (prepared as described above) at 7 and 14-day intervals. The results are shown in Tables 2 and 3 wherein the infectivity end-points obtained at 32°C. are shown in medium with 1% (Table 2) and without (Table 3) fetal calf serum.

As shown in these Tables, the optimum virus yield was obtained in serial passages performed either at 7 to 14-day intervals.

Generally, the results show that the infected cultures maintained without fetal calf serum were as good as those maintained in the presence of fetal calf serum.

TABLE 2

SERIAL PASSAGE OF RUBELLA VIRUS HPV-78 IN TURKEY EMBRYO TISSUE CULTURE MAINTAINED IN THE PRESENCE OF 1 PERCENT FETAL CALF SERUM

| Passage number | 7 days | 14 days |
|---|---|---|
| TE*-1 | 2.0 − 2.25** | 1.25 − 3.5** |
| TE -2 | 0.25 − 3.0 | 2.25 − 3.0 |
| TE -3 | 1.25 − 2.55 | 1.0 − 3.5 |
| TE -4 | <0.5 − 3.0 | <0.5 − 3.5 |

* Turkey embryo tissue culture
** Range of infectivity end-points in $\log_{10}/0.5$ ml virus suspension.

TABLE 3

SERIAL PASSAGE OF RUBELLA VIRUS HPV-78 IN TURKEY EMBRYO TISSUE CULTURE MAINTAINED WITHOUT SERUM

| Passage number | 7 days | 14 days |
|---|---|---|
| TE*-1 | 2.2 − 2.25** | <0.5 − 2.75** |
| TE -2 | <0.5 − 2.75 | 2.75 − 3.0 |
| TE -3 | 3.5 − 3.75 | 2.75 − 3.25 |
| TE -4 | 2.25 − 3.75 | 3.75 |

* Turkey embryo tissue culture
** Range of infectivity end-points in $\log_{10}/0.5$ ml virus suspension.

Cytopathic effect in RK-13 cells

The high passage level rubella viruses grown in turkey embryo tissue cultures as described hereinbefore were tested for their ability to propagate in RK-13 cells and compared with the same viruses grown in monkey kidney cell cultures.

As described in Meyer et al. U.S. Pat. No. 3,651,212, ordinarily the presence of the rubella virus is detected by its capacity to interfere with superinfection by a second virus and rubella virus infectivity can therefore be quantitatively titrated as a result of such interference. On the other hand, rubella virus produces rapid cytopathic changes in RK-13 cell cultures but only after three to 10 passages in homologous cells. Comparisons were made of the ability of HPV-77 to propagate both with the virus grown in turkey embryo tissue cultures and monkey kidney cells. A comparison was also established with the virulent strain M-33.

The results are shown in Table 4.

TABLE 4

GROWTH OF RUBELLA VIRUS IN RK-13 CELLS

| Seeds passage | Days of culture | Infectivity End-points* |
|---|---|---|
| HPV-77-TE-1 ** | 7 | 2.5 |
|  | 14 | 1.75 |
| HPV-77 | 7 | 2.25 |
| HPV-77 | 7 | 3.25 |
| M-33 | 7 | <0.5 |

* Infectivity end-points in $\log_{10}/0.5$ ml virus suspension.
** Turkey Embryo
Note: Readings were made after 7 days and 14 days as indicated at 35°C.

The virus can be harvested in any conventional manner and stored either in the frozen state or in the freeze-dried state.

I claim:

1. A method of propagating the HPV-77 strain of rubella virus, which comprises,
   serially passing the virus in from one to four passages through fresh turkey embryo tissue culture by introducing the strain into the tissue, incubating the culture, harvesting the virus so propagated, introducing it into a further fresh turkey embryo tissue culture,
   and recovering the virus so propagated having the characteristics of the starting virus.

2. A method, as defined in claim 1, in which there is a single passage.

3. A method, as defined in claim 1, in which there are four passages.

4. A method, as defined in claim 1, in which the virus is harvested from 1 to 3 days after the third day.

5. A method, as defined in claim 3, in which the passages take place up to 14 days.

6. A method, as defined in claim 3, in which the starting HPV-77 virus has a titer of $10^{4.3}$ per half milliliter and the propagated virus recovered has a titer not less than $10^2$ per half milliliter.

7. A method, as defined in claim 3, in which the starting HPV-77 virus has a titer of $10^{4.3}$ per half milliliter and the propagated virus recovered has a titer in the range from about $10^{3.5}$ to about $10^{3.75}$ per half milliliter.

* * * * *